(12) United States Patent
Weaver et al.

(10) Patent No.: US 6,781,730 B2
(45) Date of Patent: Aug. 24, 2004

(54) VARIABLE WAVELENGTH ATTENUATOR FOR SPECTRAL GROOMING AND DYNAMIC CHANNEL EQUALIZATION USING MICROMIRROR ROUTING

(75) Inventors: Samuel P. Weaver, Boulder, CO (US); Anthony W. Sarto, Platteville, CO (US)

(73) Assignee: PTS Corporation, San Jose, CA (US)

( * ) Notice: Subject to any disclaimer, the term of this patent is extended or adjusted under 35 U.S.C. 154(b) by 0 days.

(21) Appl. No.: 10/243,924

(22) Filed: Sep. 12, 2002

(65) Prior Publication Data

US 2003/0168708 A1 Sep. 11, 2003

Related U.S. Application Data

(60) Provisional application No. 60/363,724, filed on Mar. 11, 2002.

(51) Int. Cl.[7] ............................. G02B 26/08; G02F 1/07
(52) U.S. Cl. ...................... 359/212; 359/254; 359/318
(58) Field of Search ............................ 385/17, 18, 31, 385/33, 25, 47, 140; 359/128, 588, 589, 256, 315, 319, 245, 250, 212, 254, 318, 247, 515

(56) References Cited

U.S. PATENT DOCUMENTS

| | | |
|---|---|---|
| 5,414,540 A | 5/1995 | Patel et al. |
| 5,917,625 A | 6/1999 | Ogusu et al. |
| 5,960,133 A | 9/1999 | Tomlinson |
| 5,999,672 A | 12/1999 | Hunter et al. |
| 6,097,519 A | 8/2000 | Ford et al. |
| 6,097,859 A | 8/2000 | Solgaard et al. |
| 6,108,471 A | 8/2000 | Zhang et al. |
| 6,307,657 B1 | 10/2001 | Ford |
| 6,501,877 B1 * | 12/2002 | Weverka et al. ............. 385/31 |
| 6,529,307 B1 | 3/2003 | Peng et al. |

OTHER PUBLICATIONS

Nishi et al. (Broad–Passband–Width Optical Filter for Multi/Demultiplexer Using a Diffraction Grating and a Retroreflector Prism, Electronics Letters, May 9, 1985, vol. 21, No. 10.*
Ford, Joseph E., et al., "Wavelength Add–Drop Switching Using Tilting Micromirrors," Journal of Lightwave Technology, vol. 17, No. 5, May 1999; pp. 904–911.
Grade, John D., et al., "A Large–Deflection Electrostatic Actuator for Optical Switching Applications," Solid State Sensor and Actuator Workshop, Hilton Head Island, South Carolina, Jun. 4–8, 2000; 97–100.
Nishi, I., "Broad–Passband–Width Optical Filter for Multi/Demultiplexer Using a Diffraction Grating and a Retroreflector Prism," Electronics Letters, vol. 21, No. 10, pp. 423–424; May 9, 1985.
Phillippe, P., et al., "Wavelength demultiplexer: using echelette gratings on silicon substrate," Applied Optics, vol. 24. No. 7, Apr. 1, 1985; pp. 1006–1011.
Rallison, R.D., et al., "Dense Wavelength Division Multiplexing (DWDM) and the Dickson Grating," White Paper; Jan. 6, 2001.
Sun, Z. J , et al "Demultiplexer with 120 Channels and 0.29–nm Channel Spacing," IEEE Photonics Technology Letters, vol. 10, No 1, Jan. 1, 1998, pp. 90–92.

* cited by examiner

*Primary Examiner*—Minh-Loan Tran
(74) *Attorney, Agent, or Firm*—Townsend and Townsend and Crew LLP

(57) ABSTRACT

A method and apparatus are provided for spectral grooming of light having a multiple spectral bands. The light is received at an input port and encounters an optical train disposed between the input port and at least one output port. The optical train provides optical paths for routing the spectral bands and includes a dispersive element disposed to intercept light traveling from the input port. An attenuation mechanism is provided for independently attenuating the individual spectral bands. The attenuation mechanism has multiple configurable attenuation elements disposed so that each spectral band is attenuated in accordance with a state of one of the configurable attenuation elements.

37 Claims, 5 Drawing Sheets

VARIABLE WAVELENGTH ATTENUATOR FOR SPECTRAL GROOMING AND DYNAMIC CHANNEL EQUALIZATION USING MICROMIRROR ROUTING

CROSS-REFERENCE TO RELATED APPLICATION

This application is a non-provisional of and claims priority to Appl. No. 60/363,724 entitled "VARIABLE WAVELENGTH ATTENUATOR FOR SPECTRAL GROOMING USING MICROMIRROR ROUTING" filed Mar. 11, 2002, by Samuel P. Weaver, the entire disclosure of which is incorporated herein by reference for all purposes.

BACKGROUND OF THE INVENTION

This application relates generally to fiber-optic communications. This application relates more specifically to methods and apparatuses for spectral grooming of optical signals.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, SONET/SDH systems are designed to process only a single optical channel. Multi-wavelength systems currently require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In optical networking applications, a given signal may encounter multiple optical components, some of which may have different responses than the others depending on the wavelength of the signal. When signals are multiplexed on a light stream carrying many individual wavelengths, such wavelength-dependent responses may cause undesirable variations between wavelength channels across the multiplexed signal. This variation may be particularly manifested as differences in the power spectrum as a function of the varying wavelengths. It is desirable to provide an efficient mechanism by which individual wavelength signals may be attenuated to correct the power spectrum to have the desired values across all wavelengths.

BRIEF SUMMARY OF THE INVENTION

Embodiments of the invention are thus directed to a method and apparatus for spectral grooming of light having a plurality of spectral bands. According to embodiments of the invention, the apparatus may be provided as a variable wavelength attenuator. The light is received at an input port and encounters an optical train disposed between the input port and an output port. The optical train provides optical paths for routing the spectral bands and includes a dispersive element disposed to intercept light traveling from the input port. An attenuation mechanism is provided for independently attenuating the individual spectral bands. The attenuation mechanism has a plurality of configurable attenuation elements disposed so that each spectral band is attenuated in accordance with a state of one of the configurable attenuation elements.

In some embodiments, the variable wavelength attenuator may function simultaneously as a wavelength router. In such instances, the output port comprises a plurality of output ports and each spectral band is routed to one of the output ports depending on the states of the configurable attenuation elements.

In one set of embodiments, the configurable attenuation elements are provided as moveable micromirrors, with the state of each configurable attenuation element corresponding to a position of that attenuation element. The micromirrors may be moveable rotationally to achieve different tilt positions or may be moveable translationally. Also, the micromirrors may be configured to be moveable among a plurality of discrete positions or may be moveable through a continuum of positions. The micromirrors may be configured to direct the spectral bands to different portions of one or more common surfaces that have portions with varying reflectivities. The attenuation of individual spectral bands may be provided in part by such reflectivity variation.

The optical train used by the invention may be adapted in various ways, some of which provide single-pass configurations and others of which provide double-pass configurations. For example, the optical train may include a single lens with the dispersive element being a reflection grating that is used to separate the light into beams that correspond to the different spectral bands. In another embodiment, a transmissive grating is substituted for the reflection grating and a pair of lenses is used on either side of the grating. In still other embodiments, optical power and dispersion are combined in a single optical element that forms part of the optical train.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Figure 1A:
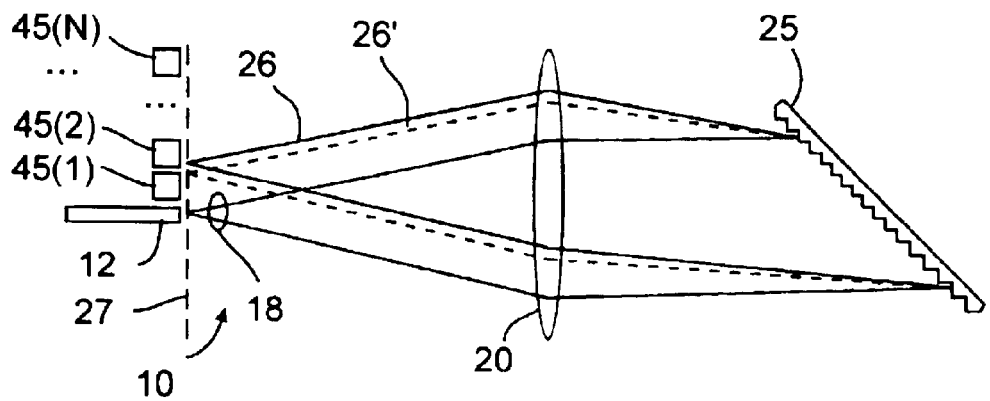
FIGS. 1A, 1B, and 1C are schematic top, side, and end views, respectively, of a variable wavelength attenuator according to a first embodiment of the invention that uses spherical focusing elements.

The following description sets forth embodiments of a variable wavelength attenuator for spectral grooming according to the invention. The general functionality of the variable wavelength attenuator is to accept light having a plurality of (say N) spectral bands at an input port, and to direct the spectral bands after attenuation according to their individual wavelength characteristics to an output port. In some embodiments, only a subset of the spectral bands are attenuated with some of the spectral bands being left unattenuated. While in some embodiments the variable wavelength attenuator is adapted to direct all spectral bands, whether or not attenuated, to a single output port, the invention may be more generally adapted to direction of attenuated unattenuated spectral bands to desired ones of a plurality of output ports.

Embodiments generally include an optical train to provide optical paths for the spectral bands and an attenuation mechanism that includes a plurality of attenuation elements disposed to attenuate spectral bands defined by different wavelengths. In some embodiments, the attenuation elements may additionally be configured for routing the spectral bands to desired ones of a plurality of output ports. In such embodiments, the attenuation mechanism additionally functions as a routing mechanism that routes spectral bands corresponding to different wavelength channels differently. Embodiments that combine the attenuation and routing aspects may thus be viewed as providing wavelength routers equipped for selectively routing and attenuating spectral bands received on one or more input signals to one or more output signals.

In some embodiments, the optical train comprises a free-space optical train. The term "free space" refers to the fact that light within the body of the wavelength attenuator is not confined in the dimensions transverse to propagation, but can be regarding as diffracting in these transverse dimensions. Free-space optical trains may include airspace embodiments or embodiments in which the various beams are all within a body, such as of glass, examples of both of which are provided below. In some embodiments, the free-space optical train may be the same or similar to a free-space optical train used in embodiments of a wavelength router, such as may be adapted for performing optical-network switching functions, including wavelength-selective cross connection and add-drop multiplexing. Examples of such free-space optical trains are provided in copending, commonly assigned U.S. Pat. Appl. No. 09/442,061 entitled "WAVELENGTH ROUTER," filed Nov. 16, 1999 by Robert T. Weverka et al., the entire disclosure of which, including the Appendix, is herein incorporated by reference for all purposes. In other embodiments, the optical train comprises waveguide elements, such as described in U.S. Pat. No. 6,208,316, issued to Robert Cahill, the entire disclosure of which is herein incorporated by reference for all purposes.

Embodiments of the invention include a dispersive element, such as a diffraction grating or a prism, which operates to deflect incoming light by a wavelength-dependent amount. Different portions of the deflected light are intercepted by different attenuation elements. Although the incoming light could have a continuous spectrum, adjacent segments of which could be considered different spectral bands, it is generally contemplated that the spectrum of the incoming light will have a plurality of bands spaced in wavelength.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. Most of the embodiments contemplate that light will diverge as it enters the wavelength router after passing through the input port, and will be converging within the wavelength router as it approaches the output port. However, this is not necessary.

The International Telecommunications Union (ITU) has defined a standard wavelength grid having a frequency band centered at 194,100 GHz, and another band at every 50 GHz interval around 194,100 GHz. This corresponds to a wavelength spacing of approximately 0.4 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 100 GHz (corresponding to wavelength spacings of approximately 0.2 nm and 0.8 nm) are also of interest.

2. Use of Spherical Focusing Elements

Figure 1B:
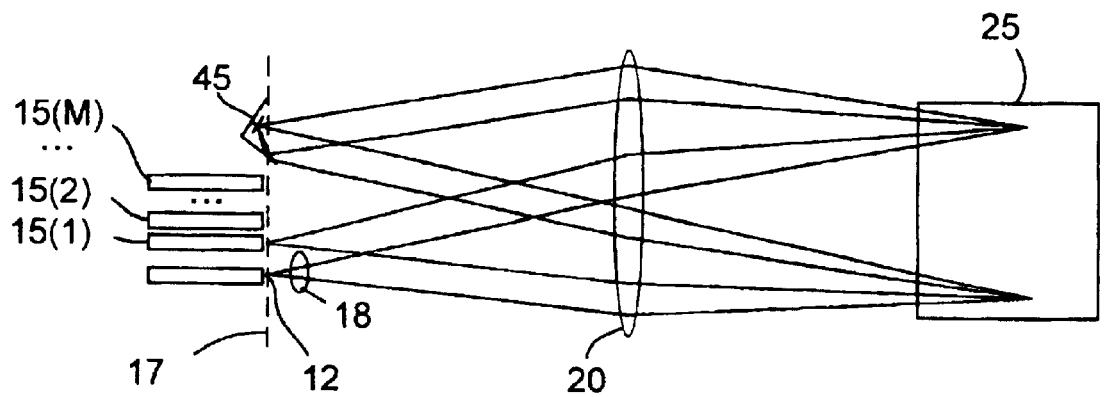
Figure 1C:
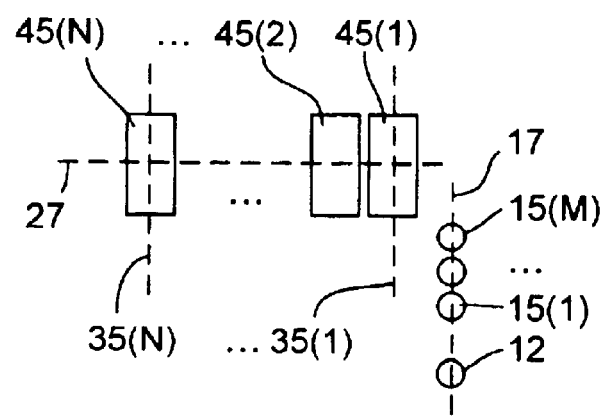

FIGS. 1A, 1B, and 1C are schematic top, side, and end views, respectively, of a variable wavelength attenuator 10 according to an embodiment of the invention. The general functionality of the variable wavelength attenuator 10 is to accept light having a plurality of (say N) spectral bands at an input port 12, and selectively to attenuate the spectral bands for spectral grooming of the light. The attenuated spectral bands are directed to one or more output ports, which are shown in end view of FIG. 1C as disposed along a line 17 that extends generally perpendicular to the top view of FIG. 1A. The input and output ports are shown as communicating with respective input and output optical fibers, but it should be understood that the input port could also receive light directly from a light source, and the output ports could be coupled directly to optical detectors.

Light entering the variable wavelength attenuator 10 from the input port 12 forms a diverging beam 18, which includes the different spectral bands. The beam 18 encounters a lens 20, which collimates the light and directs it to a reflective diffraction grating 25. The grating 25 disperses the light so that collimated beams at different wavelengths are directed at different angles back towards the lens 20. Two such beams are shown explicitly and denoted 26 and 26', the latter drawn in dashed lines. Since these collimated beams encounter the lens at different angles, they are focused at different points along a line 27 in a transverse focal plane. Line 27 extends in the plane of the top view of FIG. 1A.

The focused beams encounter respective ones of a plurality of attenuation and/or routing elements 45 (1, ..., N), located near the focal plane. The attenuation/routing elements 45 act as described below with respect to FIG. 2 simultaneously to attenuate and retroreflect the spectral bands as diverging beams back towards the lens 20. The beams returning from the attenuation elements 45 are collimated by the lens 20 and directed again to the grating 25. The grating 25 removes the angular separation between the different beams on its second encounter, and directs the collimated beams back to the lens 20, which focuses them. In some embodiments in which the variable wavelength attenuator 10 is configured only for selective attenuation of the incoming light, all of the beams are focused to a particular output port, say 15(1), resulting in remultiplexing of the groomed spectrum. In other embodiments in which the variable wavelength attenuator 10 functions both to route and to attenuated selected spectral bands, the beams may be displaced by the attenuation/routing elements 45 so that certain of the spectral bands are focused at different points along line 17 to be received by other output ports 15. In some embodiments, the attenuation/routing elements 45 may be configured so that one or more of the spectral bands are directed back to the input port 12, with the incoming and outgoing light being directed with a fiber circulator.

Figure 2A:
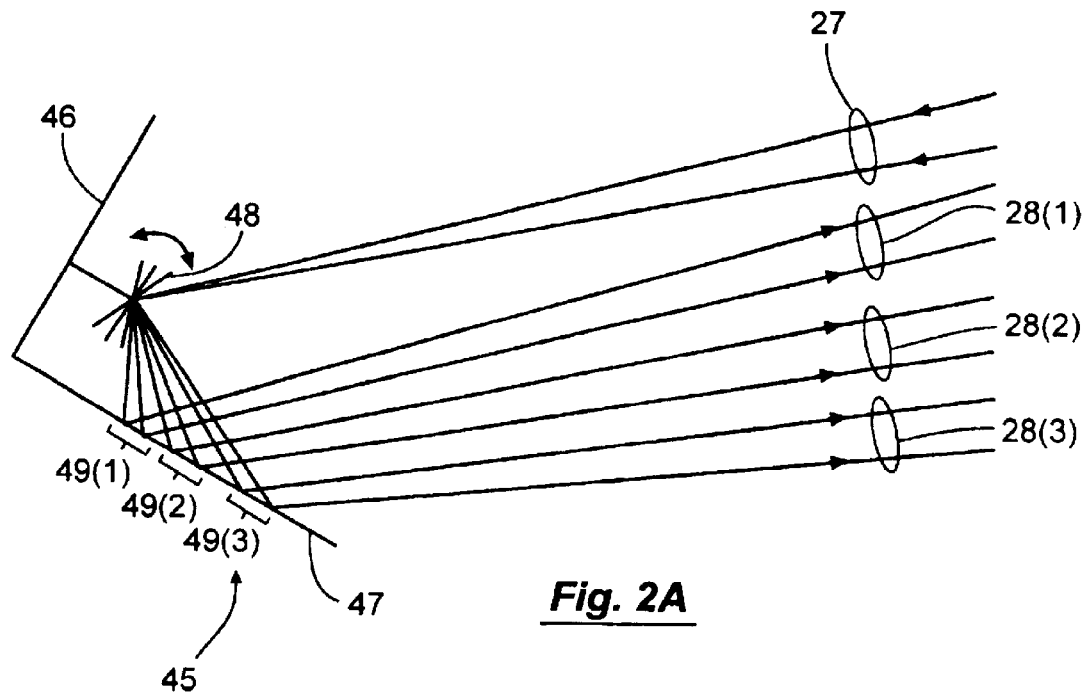
FIGS. 2A and 2B are schematic illustrations of micromirror arrangements that may be used for wavelength-dependent attenuation in different embodiments of the invention.
Figure 2B:
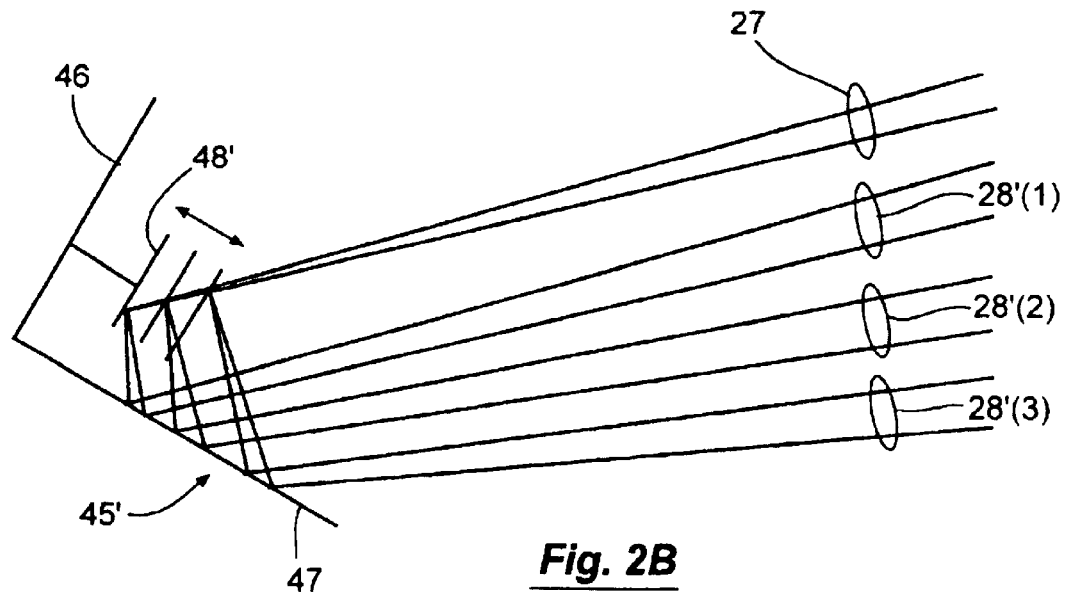

The operation of the attenuation/routing elements 45 may be understood in different embodiments with reference to FIGS. 2A and 2B. In both embodiments, each attenuation/routing element 45 comprises a fixed reflective surface 47 and a moveable micromirror that is formed over surface 46. A single fixed surface 46 and/or a single fixed surface 47 may be common to all of the attenuation/routing elements 45. The moveable micromirror may be a tiltable micromirror 48 as shown in FIG. 2A or may be a translatable micromirror 48' as shown in FIG. 2B. In either instance, the moveable micromirror may be configured for analog motion so that a continuous range of positions may be achieved or may be configured to adopt a plurality of discrete positions.

Referring specifically to FIG. 2A, attenuation of incoming beam 27 is achieved by adopting a desired tilt of the tiltable micromirror 48. Three such positions are shown for purposes of illustration, and may represent discretely or continuously available tilt positions for the micromirror 48. Micromirrors capable of assuming such a plurality of positions may be formed using standard microelectromechanical systems ("MEMS") techniques that are known to those of skill in the art. The effect of the different positions is to displace the relative beam position after it is retroreflected by encountering both the micromirror 48 and the reflective surface 47. The retroreflected beam 28 may thus take any of a plurality of paths, three of which are shown in FIG. 2A, depending on the tilt position of the micromirror 48.

In the illustrated embodiment, the fixed reflective surface 47 includes portions 49 having different reflectivities. For example, the first portion 49(1) may be highly reflective, the second portion 49(2) may be moderately reflective, and the third portion 49(3) may be poorly reflective. Consequently, when the tiltable micromirror 48 is in a first position, the retroreflected beam 28(1) is only slightly attenuated; when the tiltable micromirror 48 is in a second position, the retroreflected beam 28(2) is moderately attenuated; and when the tiltable micromirror 48 is in a third position, the retroreflected beam 28(3) is significantly attenuated. In other embodiments, a different number of regions with different reflectivities may be provided. In one embodiment, the fixed reflective surface 47 has a continuously varying reflectivity; such an embodiment may be especially suitable when the micromirror is configured for analog motion to a continuous range of positions. The attenuation of the retroreflected beam 28 derives from the combination of the resulting angular mispoint at the output fiber(s) and from the reflectivity variation. Each of the plurality of tiltable micromirrors 48 may be in a different position for each of the spectral bands, thereby providing variable attenuation to achieve the desired spectral grooming. Moreover, in embodiments having a plurality of output ports, each of the tiltable micromirrors 48 may be positioned to direct the retroreflected beam 28 to a desired one of the output ports, thereby acting to achieve a desired routing of the spectral bands.

The use of translatable micromirrors 48' in the attenuation element 45' as shown in FIG. 2B is similar, with different attenuations being achieved by positioning the micromirror 48' at different heights above fixed surface 46. The variation in such heights results in misalignments of the retroreflected beams 28' to achieve the desired attenuations and spectral grooming. In some embodiments, the fixed reflective surface 47 may include portions with differently reflectivities as described with respect to FIG. 2A, thereby permitting the desired attenuation to be achieved with a combination of beam misalignment and reflectivity variation. Furthermore, in embodiments having a plurality of output ports, each of the translatable micromirrors 48' may be positioned to direct the retroreflected beam 28' to a desired one of the output ports, thereby acting to achieve a desired routing of the spectral bands. MEMS techniques may also be used to fabricate translatable micromirrors 48' configured to adopt continuous or discrete positions. A general description of systems that use translatable micromirrors in wavelength routing applications is provided in copending, commonly assigned U.S. Appl. No. 09/658,158, entitled "LINEAR OPTICAL BEAM TRANSLATOR FOR OPTICAL ROUTING," filed Sep. 8, 2000 by Samuel P. Weaver et al., the entire disclosure of which is herein incorporated by reference for all purposes.

In still other embodiments, other moveable configurations may be used for the micromirrors, combining translation and rotation. Also, while it is generally contemplated that all of the micromirrors configured to encounter the different spectral bands will be configured for similar motion characteristics, this is not a requirement and a mixture of tiltable and translatable micromirrors may be used.

One result of the attenuation is that the optical paths 28 or 28' are displaced relative to each other depending on the position of the moveable micromirror, the displacement being an angular displacement in embodiments using rotatable micromirrors and being a linear displacement in embodiments using translatable micromirrors. In embodiments that use only a single output port 15, the total extent of such relative angular or linear displacement is sufficiently small that all the spectral bands are still focused to the single output port. This may be achieved, for example, by ensuring that extremal positions of the moveable micromirror result in relatively displaced positions for optical paths that are less than the size of a core in an output fiber. In other embodiments, a larger extent of displacement or multiple reflective surfaces 47 may be used so that different spectral bands may be focused to different output ports 15 as a result of the larger angular or linear displacement.

Figure 3A:
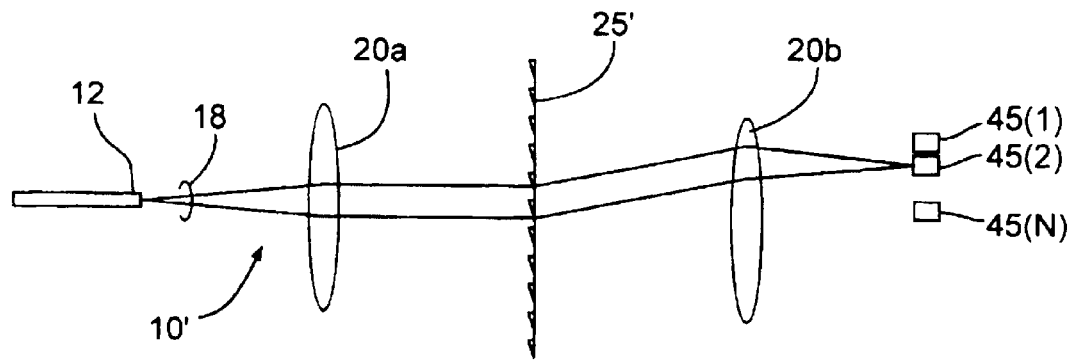
FIGS. 3A and 3B are schematic top and side views, respectively, of a variable wavelength attenuator according to a second embodiment of the invention that uses spherical focusing elements.
Figure 3B:
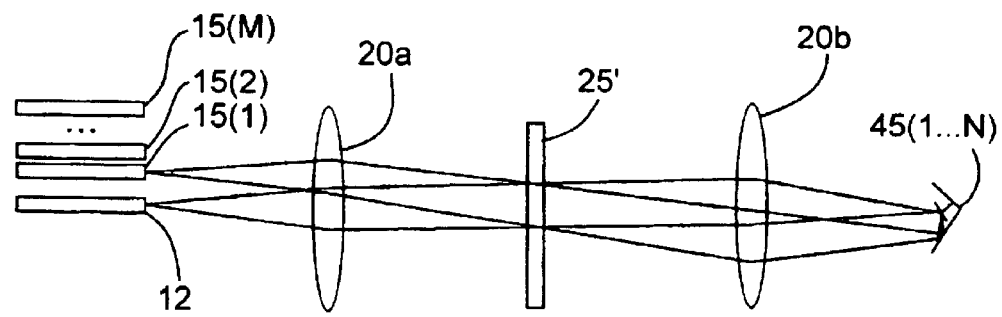

The attenuation/routing elements 45 may be incorporated in a variety of other embodiments, one of which is shown respectively in schematic top and side views in FIGS. 3A and 3B. This embodiment provides a variable wavelength attenuator 10' that differs from the embodiment of FIGS. 1A–1C in that it uses a transmissive diffraction grating 25' and a pair of lenses 20a and 20b. Light entering the variable wavelength attenuator 10' from the input port 12 forms a diverging beam 18, which includes the different spectral bands. The beam 18 encounters the first lens 20a, which collimates the light and directs it to the grating 25'. The, grating 25' disperses the light so that collimated beams at different wavelengths emerge from the beam and proceed. The collimated beams, one of which is shown, encounter the second lens 20b, which focuses the beams. The focused beams encounter respective ones of a plurality of attenuation/routing elements 45 configured as described with respect to FIGS. 2A and 2B to retroreflect attenuated beams back to lens 20b, where they are collimated and directed to the grating 25'. On the second encounter, the grating 25' removes the angular separation between the different beams, which are then focused onto one or more output ports 15 depending on the configuration of the attenuation/routing elements 45.

The embodiment shown in FIGS. 3A and 3B may be considered an unfolded version of the embodiment shown in FIGS. 1A–1C. In a specific implementation, the input port, lens 20a, grating 25', lens 20b, and attenuation elements 45 are spaced at approximately equal intervals, with the two lenses having equal focal lengths and the distance between the input port 12 and the attenuation/routing elements 45 being four times the focal length. Thus, the focal lengths and the relative positions define what is referred to as a "4f relay" between the input port 12 and the attenuation/routing elements 45, and also a 4f relay between the attenuation/routing elements 45 and the output port(s) 15. The optical system may be telecentric.

Figure 4:
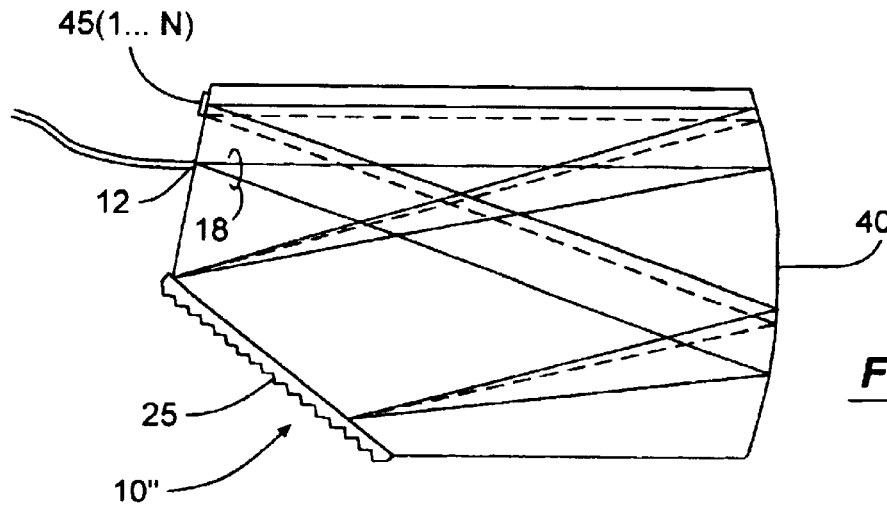
FIG. 4 is a schematic top view of a variable wavelength attenuator according to a third embodiment of the invention that uses spherical focusing elements.

FIG. 4 is a schematic top view of another embodiment of a variable wavelength attenuator 10" that may be considered to be a further folded version the embodiment of FIGS. 1A–1C. This embodiment is a solid-glass embodiment that uses a concave reflector 40 in place of the lens 20 of the embodiment shown in FIGS. 1A–1C, or in place of lenses 20a and 20b of the embodiment shown in FIGS. 3A and 3B. As for the other embodiments, light entering the variable wavelength attenuator 10" from the input port 12 forms a diverging beam 18 that includes the different spectral bands. The beam is collimated by the concave reflector 40, which directs it to the reflective diffraction grating 25. The grating 25 disperses the light so that collimated beams at different wavelengths are directed at different angles back towards the reflector 40. Two such beams are shown explicitly, one in solid lines and one in dashed lines. Since these collimated beams encounter the reflector 40 at different angles, they are focused at different points in a transverse focal plane.

The focused beams encounter attenuation elements 45 located near the focal plane. The attenuation elements 45 may be configured as described with respect to FIGS. 2A and 2B to effect attenuation to achieve the desired spectral grooming. The operation in the reverse direction is as described in connection with the embodiments above, and the beams follow the reverse path, which underlies the forward path and is therefore not visible in FIG. 4. On this return path, the beams encounter the concave reflector 40, the reflective grating 25', and the concave reflector 40, the final encounter with which focuses the beams to the desired output port(s) (not shown in FIG. 4 because it underlies the input port 12).

3. Use of Cylindrical Focusing Elements

The attenuation elements 45 may also be incorporated within a variable wavelength attenuator that uses cylindrical instead of spherical focusing elements. One example of such an embodiment is provided in FIGS. 5A and 5B, which are respectively schematic top and side views of such a variable wavelength attenuator 70. This embodiment is an unfolded embodiment, and thus could be considered to correspond to the embodiment of FIGS. 3A and 3B. This embodiment includes a transmissive diffraction grating 25', as in the embodiment of FIGS. 3A and 3B, but differs from that embodiment in that it uses cylindrical lenses rather than spherical senses. The general functionality of the variable wavelength attenuator 70 is the same as the other embodiments, namely to provide spectral grooming to light having a plurality of spectral bands received at the input port 12.

Figure 5A:
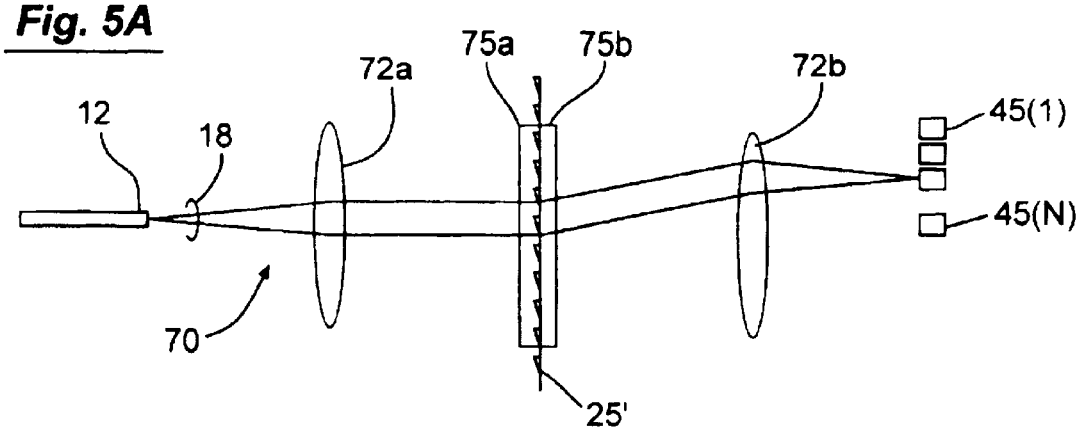
FIGS. 5A and 5B are schematic top and side views, respectively, of a variable wavelength attenuator according to a first embodiment of the invention that uses cylindrical focusing elements.
Figure 5B:
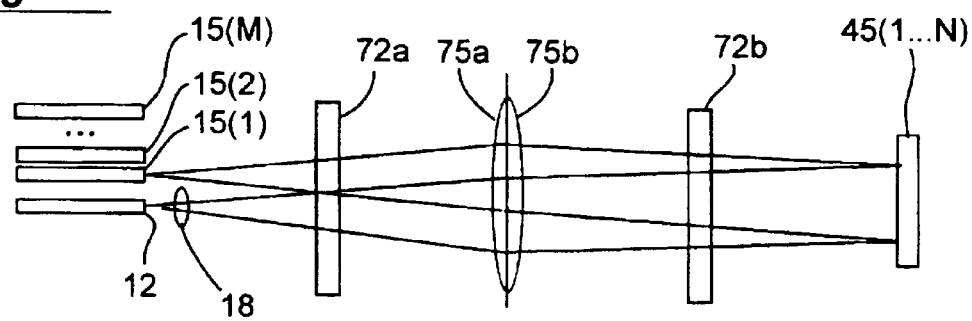

The cylindrical lenses include a pair of lenses 72a and 72b, each having refractive power only in the plane of the top view (FIG. 5A), and a pair of lenses 75a and 75b each having refractive power only in the plane of the side view (FIG. 5B). As such, lenses 72a and 72b are drawn as rectangles in the plane of FIG. 5B, and lenses 75a and 75b are drawn as rectangles in the plane of FIG. 5A.

Light entering the variable wavelength attenuator 70 from the input port 12 forms a diverging beam 18, which includes the different spectral bands. The beam 18 encounters lens 72a, which collimates the light in one transverse dimension, but not the other, so that the beam has a transverse cross section that changes from circular to elliptical, i.e. the beam continues to expand in the plane of FIG. 5B, but not in the plane of FIG. 5A. The beam encounters lens 75a, grating 25', and lens 75b. Together, lenses 75a and 75b collimate the light that is diverging in the plane of FIG. 5B so that the beam propagates with a constant elliptical cross section. The grating 25' disperses the light in the plane of FIG. 5A so that beams at different wavelengths are transmitted at different angles in the plane of FIG. 5A, but not in the plane of FIG. 5B. The collimated beams encounter lens 72b and are focused to respective lines. The focused beams encounter respective ones of the attenuation elements 45 (1, . . . , N), located near the focal plane. The beams are simultaneously attenuated and retroreflected by the attenuation elements 45 as described above.

The return beams undergo different transformations in the planes of FIGS. 5A and 5B. The return beams are directed, diverging only in the plane of FIG. 5A, to lens 72b. Thus, in the plane of FIG. 5A, the beams are collimated by lens 72b, and directed once more to grating 25' (in this plane, lenses 75b and 75a do not change the collimated character of the beams). Grating 25', on this second encounter, removes the angular separation between the different beams (only in the plane of FIG. 5A) at the output port(s) 15. In FIG. 5A, the return beams are not shown separately, but rather have projections in the plane that coincides with the projection of the forward beam. In the plane of FIG. 5B, the beams are focused by lenses 75a and 75b onto the output port(s) 15. In FIG. 5B, the grating 25' and lenses 72b and 72a do not affect the direction of the beams, or whether the beams are diverging, collimated, or converging.

As part of the function of the attenuation elements 45, the return beams may be displaced by different amounts. In embodiments that use only a single output port, the extent of such displacement will generally be sufficiently small that all the return beams may still be accepted by the output port. In embodiments that use a plurality of output ports, the extent of the displacement may be sufficiently large that different return beams may be directed to different output ports.

In one implementation, input port 12, lens 72a, lens pair 75a/75b, lens 72b, and the attenuation elements 45 are spaced at approximately equal intervals, with the focal length defined by lens pair 75a/75b being twice that of lenses 72a and 72b, although this is not a necessary requirement. With these focal lengths and relative positions, lenses 72a and 72b define a 4f relay between input port 12 and the attenuation elements 45. In addition, the lens pair 75a/75b is encountered twice and defines a 4f relay between the input and output ports. In one embodiment, the optical system is telecentric.

Figure 6A:
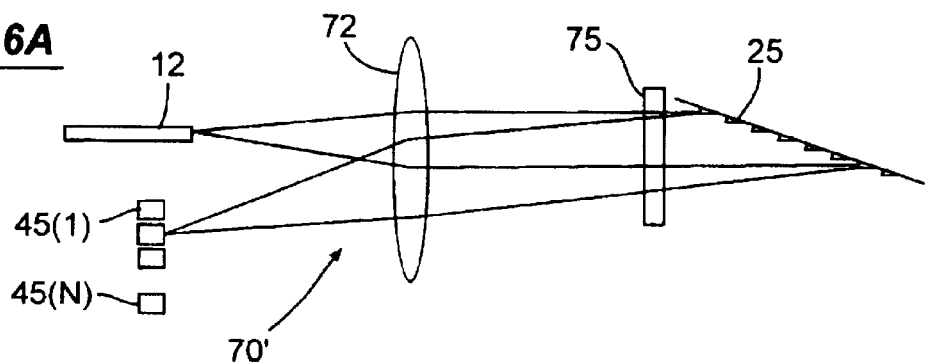
FIGS. 6A and 6B are schematic top and side views, respectively of a variable wavelength attenuator according to a second embodiment of the invention that uses cylindrical focusing elements.
Figure 6B:
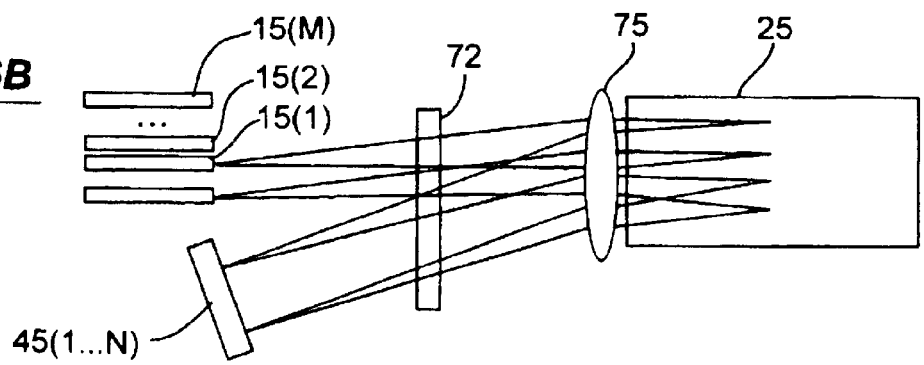

FIGS. 6A and 6B are respectively schematic top and side views of another embodiment of a variable wavelength attenuator 70' that uses cylindrical focusing elements. This embodiment may be viewed as a folded version of the embodiment of FIGS. 5A and 5B, and thus relates to that embodiment in a similar way to the way that the embodiment of FIGS. 1A–1C is a folded version of the embodiment of FIGS. 3A and 3B. Like the embodiment of FIGS. 1A–1C, the variable wavelength attenuator 70' uses a reflective diffraction grating 25. In view of its folded nature, this embodiment uses single cylindrical lenses 72 and 75 corresponding to lens pairs 72a/72b and 75a/75b in the embodiment of FIGS. 5A and 5B.

The operation of the variable wavelength attenuator 70' is substantially the same as in the embodiment of FIGS. 5A and 5B except for the folding of the optical path. In this embodiment, the light encounters each lens four times, twice between the input port 12 and the attenuation elements 45, and twice on the way from the attenuation elements 45 to the output port(s) 45. Diverging light encountering lens 75 is made less divergent after the first encounter and is collimated after the second encounter.

4. Combination of Focusing and Dispersion Elements

Figure 7A:
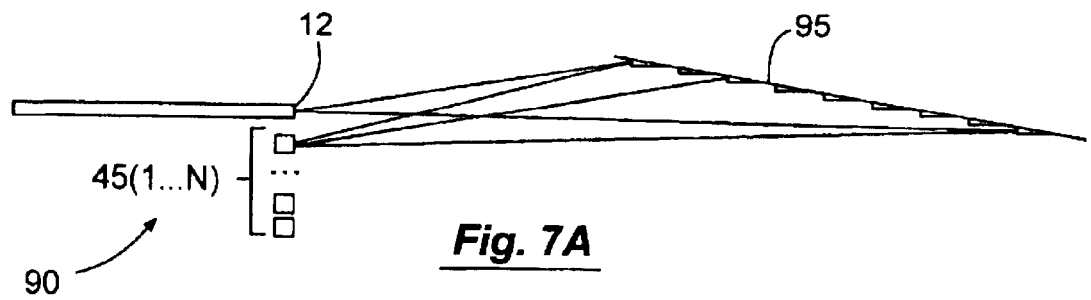
FIGS. 7A and 7B are schematic top and side views, respectively, of a variable wavelength attenuator according to an embodiment of the invention that combines spherical focusing power and dispersion in a single element.
Figure 7B:
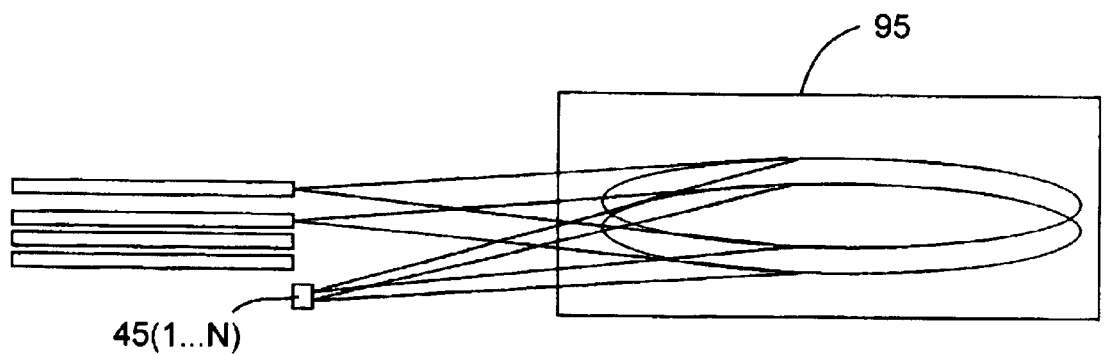

FIGS. 7A and 7B are respectively schematic top and side views of a variable wavelength attenuator 90 that combines optical power and dispersion in a single element 95. This embodiment corresponds generally to the variable wavelength attenuator shown in FIGS. 1A–1C with spherical focal power incorporated into the grating itself, such as by ruling the grating on a curved surface or by ruling curved grating lines on a flat surface. Alternatively, a holographic method may be used in which photoresist is spun onto the grating substrate and exposed with the interference pattern from two diverging beams of light emanating from the intended source and focal points of the grating. The exposure light is at the midband wavelength or at an integer multiple of the midband wavelength. The exposed photoresist may be developed and used as is, or may be used as a barrier in an etching process.

Figure 8A:
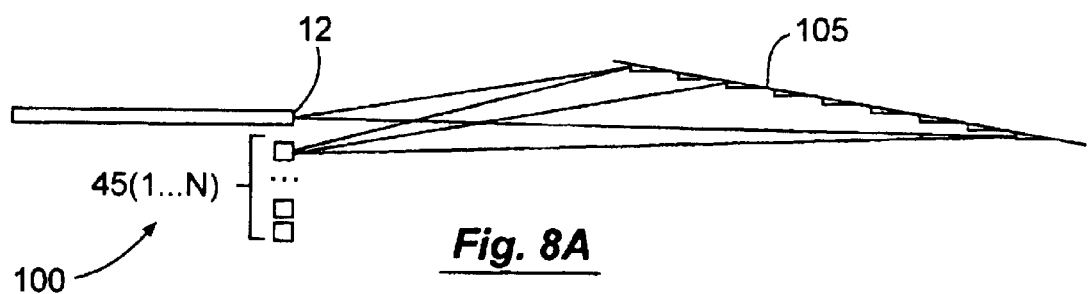
FIGS. 8A and 8B are schematic top and side views, respectively, of a variable wavelength attenuator according to an embodiment of the invention that combines cylindrical focusing power and dispersion in a single element.
Figure 8B:
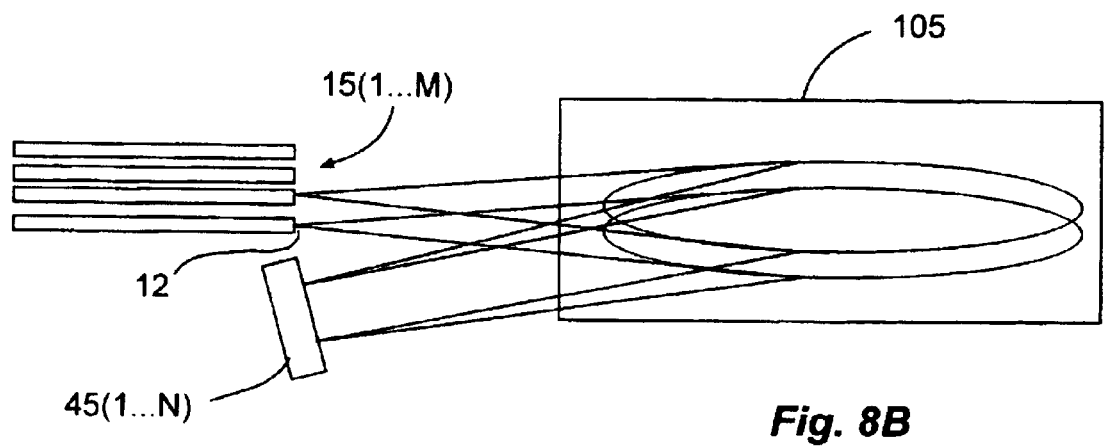

FIGS. 8A and 8B are respectively schematic top and side views of a variable wavelength attenuator 100 that corresponds generally to the embodiment of FIGS. 6A and 6B, except that the cylindrical focal power is incorporated in the grating ruling in a single element. The focal power in the dimension of the top view of FIG. 8A is twice that in the side view of FIG. 8B. The holographic version of this grating may be constructed by exposing photoresist with the interference pattern from one diverging beam and one line source of light emanating from the intended source and focal line of the grating.

Having described several embodiments, it will be recognized by those of skill in the art that various modifications, alternative constructions, and equivalents may be used without departing from the spirit of the invention. For example, while embodiments have illustrated the use of a grating as a dispersion element, alternative embodiments may use a prism for the same function. Accordingly, the above description should not be taken as limiting the scope of the invention, which is defined in the following claims.

What is claimed is:

1. A variable wavelength attenuator for spectral grooming of light having a plurality of spectral bands received at an input port, the variable wavelength attenuator comprising:
   an optical train disposed between the input port and an output port providing optical paths for routing the spectral bands, the optical train including a dispersive element disposed to intercept light traveling from the input port; and
   an attenuation mechanism having:
      a plurality of moveable micromirrors; and
      a common reflective surface disposed to be encountered by spectral bands that encounter different moveable micromirrors,
   wherein each spectral band is attenuated in accordance with a position of one of such moveable micromirrors.

2. The variable wavelength attenuator recited in claim 1 wherein the output port comprises a plurality of output ports and each spectral band is routed to one of the output ports depending on the state of the one of such moveable micromirrors.

3. The variable wavelength attenuator recited in claim 1 wherein the input port is located at the end of an input fiber.

4. The variable wavelength attenuator recited in claim 1 wherein the at least one output port is located at the end of an output fiber.

5. The variable wavelength attenuator recited in claim 1 wherein the attenuation mechanism has a configuration that directs all of the spectral bands to the output port.

6. The variable wavelength attenuator recited in claim 1 wherein each moveable micromirror is configured to adopt a plurality of discrete positions.

7. The variable wavelength attenuator recited in claim 1 wherein the each moveable micromirror is configured to adopt a continuum of positions.

8. The variable wavelength attenuator recited in claim 1 wherein at least one moveable micromirror comprises a tiltable micromirror.

9. The variable wavelength attenuator recited in claim 1 wherein at least one moveable micromirror comprises a translatable micromirror.

10. The variable wavelength attenuator recited in claim 1 wherein the common reflective surface comprises a plurality of common reflective surfaces.

11. The variable wavelength attenuator recited in claim 1 wherein the common reflective surface includes a plurality of portions having different reflectivity, with different portions being disposed to be encountered by different spectral bands depending on the respective states of the moveable micromirrors.

12. The variable wavelength attenuator recited in claim 1 wherein the optical train is configured so that light encounters the dispersive element twice before reaching the at least one output port.

13. The variable wavelength attenuator recited in claim 1 wherein the optical train comprises a free-space optical train.

14. The variable wavelength attenuator recited in claim 1 wherein the dispersion element comprises a grating and the optical train includes optical power incorporated into the grating.

15. The variable wavelength attenuator recited in claim 1 wherein:
   the optical train includes a lens;
   the dispersive element comprises a reflection grating;
   light coming from the input port is collimated by the lens and reflected from the reflection grating as a plurality of angularly separated beams corresponding to the spectral bands; and the angularly separated beams are focused by the lens on respective ones of the moveable micromirrors.

16. The variable wavelength attenuator recited in claim 15 wherein the lens comprises a spherical lens.

17. The variable wavelength attenuator recited in claim 15 wherein the lens comprises a cylindrical lens.

18. The variable wavelength attenuator recited in claim 1 wherein:

the optical train includes a first lens and a second lens;
the dispersive element comprises a transmissive grating;
light coming from the input port is collimated by the first lens and transmitted through the grating as a plurality of angularly separated beams corresponding to the spectral bands; and
the angularly separated beams are focused by the second lens on respective ones of the moveable micromirrors.

19. The variable wavelength attenuator recited in claim 18 wherein the first and second lenses comprise spherical lenses.

20. The variable wavelength attenuator recited in claim 18 wherein the first and second lenses comprise cylindrical lenses.

21. The variable wavelength attenuator recited in claim 1 wherein:

the optical train includes a concave reflector;
the dispersive element comprises a reflection grating;
light coming from the input port is collimated by the concave reflector and reflected from the reflection grating as a plurality of angularly separated beams corresponding to the spectral bands; and
the angularly separated beams are focused by the concave reflector on respective ones of the moveable micromirrors.

22. A method for spectral grooming of light having a plurality of spectral bands, the method comprising:

collimating the light;
dispersing the light as a plurality of angularly separated beams corresponding to the spectral bands;
independently attenuating each of the spectral bands by:
reflecting the each of the spectral bands from one of a plurality of moveable micromirrors; and
reflecting the each of the spectral bands from a common reflective surface disposed to be encountered by spectral bands that encounter different moveable micromirrors,
an attenuation for the each of the spectral bands being defined by a position of the one of the plurality of moveable micromirrors;
collimating the attenuated spectral bands; and
removing the angular separation between the spectral bands to form a beam.

23. The method recited in claim 22 wherein the beam includes the plurality of spectral bands, the method further comprising focusing the beam on a single output port.

24. The method recited in claim 22 wherein the beam comprises a plurality of beams each including at least one of the plurality of spectral bands, the method further comprising focusing the plurality of beams on a plurality of output ports.

25. The method recited in claim 22 wherein the position is one of a plurality of positions defined by a rotational degree of freedom for the one of the plurality of moveable micromirrors.

26. The method recited in claim 22 wherein the position is one of a plurality of positions defined by a translational degree of freedom for the one of the plurality of moveable micromirrors.

27. The method recited in claim 22 wherein the position is one of a plurality of discrete positions for the one of the plurality of moveable micromirrors.

28. The method recited in claim 22 wherein the position is one of a continuum of positions for the one of the plurality of moveable micromirrors.

29. The method recited in claim 22 wherein reflecting the each of the spectral bands from the common reflective surface comprises reflecting the each of the spectral bands from a respective one of a plurality of surface portions having different reflectivities.

30. A variable wavelength attenuator for spectral grooming of light having a plurality of spectral bands, the variable wavelength attenuator comprising:

means for collimating the light;
means for dispersing the light as a plurality of angularly separated beams corresponding to the spectral bands;
means for independently attenuating each of the spectral bands comprising:
a plurality of moveable micromirrors, one of the moveable micromirrors being disposed for reflecting the each of the spectral bands:
a common reflective surface for reflecting the each of the spectral bands, the common reflective surface being disposed to be encountered by spectral bands that encounter different moveable micromirrors
an attenuation for the each of the spectral bands being defined by a position of the one of the moveable micromirrors;
means for collimating the attenuated spectral bands; and
means for removing the angular separation between the spectral bands to form the beam.

31. The variable wavelength attenuator recited in claim 30 wherein the beam includes the plurality of spectral bands, the variable wavelength attenuator further comprising means for focusing the beam on a single output port.

32. The variable wavelength attenuator recited in claim 30 wherein the beam comprises a plurality of beams each including at least one of the plurality of spectral bands, the variable wavelength attenuator further comprising means for focusing the plurality of beams on a plurality of output ports.

33. The variable wavelength attenuator recited in claim 30 wherein the position is one of a plurality of positions defined by a rotational degree of freedom for the one of the moveable micromirrors.

34. The variable wavelength attenuator recited in claim 30 wherein the position is one of a plurality of positions defined by a translational degree of freedom for the one of the moveable micromirrors.

35. The variable wavelength attenuator recited in claim 30 wherein the position is one of a plurality of discrete positions for the one of the moveable micromirrors.

36. The variable wavelength attenuator recited in claim 30 wherein the position is one of a continuum of positions for the one of the moveable micromirrors.

37. The variable wavelength attenuator recited in claim 30 wherein the common reflective surface comprises a plurality of surface portions having different reflectivities.

\* \* \* \* \*